United States Patent

Perry

[15] 3,648,228
[45] Mar. 7, 1972

[54] CONTROL SYSTEM FOR VEHICLES
[72] Inventor: Adolphus R. Perry, Royal Oak, Mich.
[73] Assignee: The Bendix Corporation
[22] Filed: Feb. 9, 1970
[21] Appl. No.: 9,768

[52] U.S. Cl. ..........................................................340/23
[51] Int. Cl. .........................................................G08g 1/00
[58] Field of Search................340/23, 32, 38 L; 246/182 R, 246/187 B; 180/98

[56] References Cited

UNITED STATES PATENTS

| | | | |
|---|---|---|---|
| 2,965,188 | 12/1960 | Hanysz | 180/98 |
| 3,440,600 | 4/1969 | Frech et al. | 340/23 |
| 3,263,625 | 8/1966 | Midis et al. | 104/88 |
| 2,493,755 | 1/1950 | Ferrill, Jr. | 340/32 |
| 3,038,970 | 6/1962 | Paluka | 180/98 |

Primary Examiner—Kathleen H. Claffy
Assistant Examiner—Thomas L. Kundert
Attorney—William F. Thornton and Plante, Arens, Smith and Thompson

[57] ABSTRACT

A system for controlling the spacing and velocity of a plurality of vehicles along a pathway having a signal source at each end of the pathway emitting opposing signals which superimpose so as to establish precessing nulls or characteristic value along the pathway. Each vehicle is provided with a probe to detect the nulls that it may be velocity controlled thereby.

17 Claims, 8 Drawing Figures

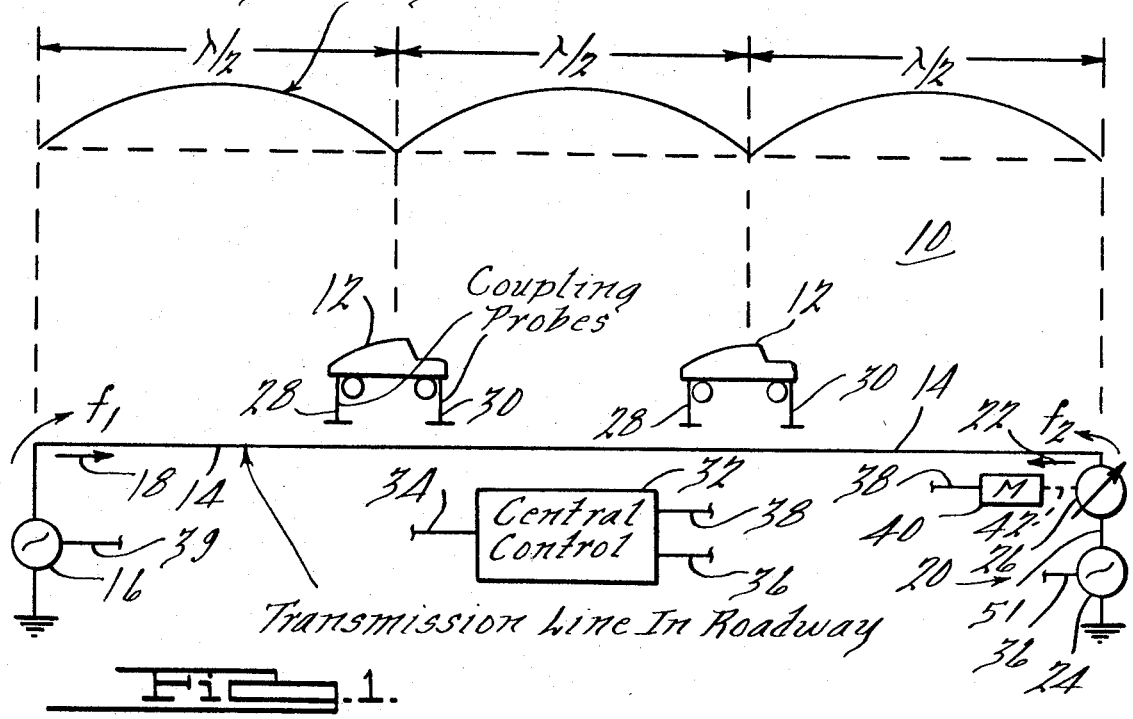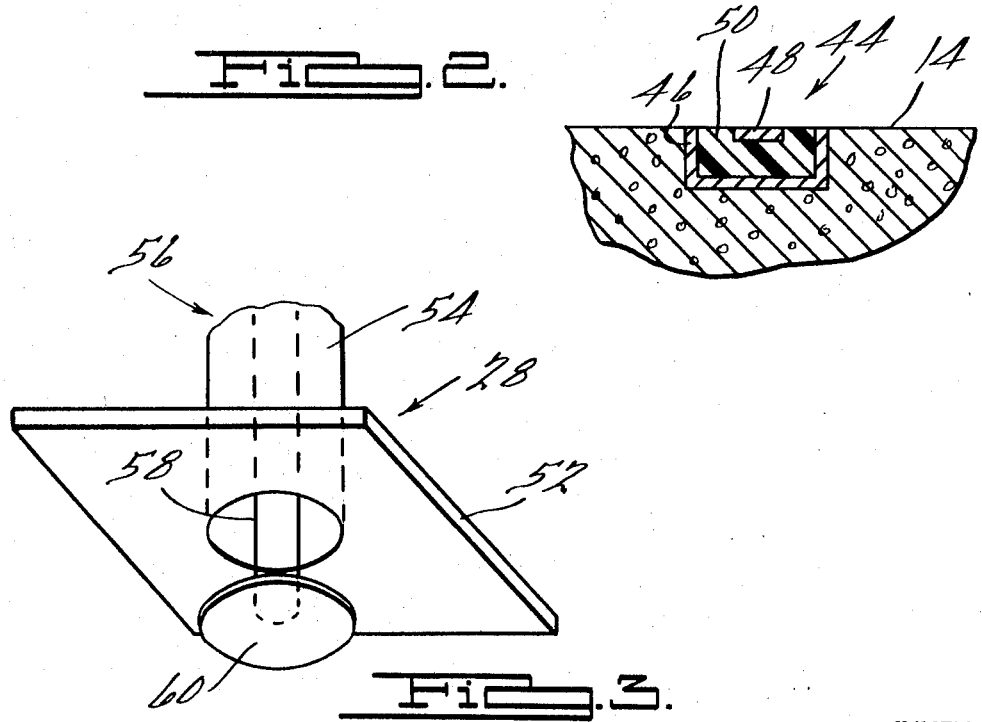

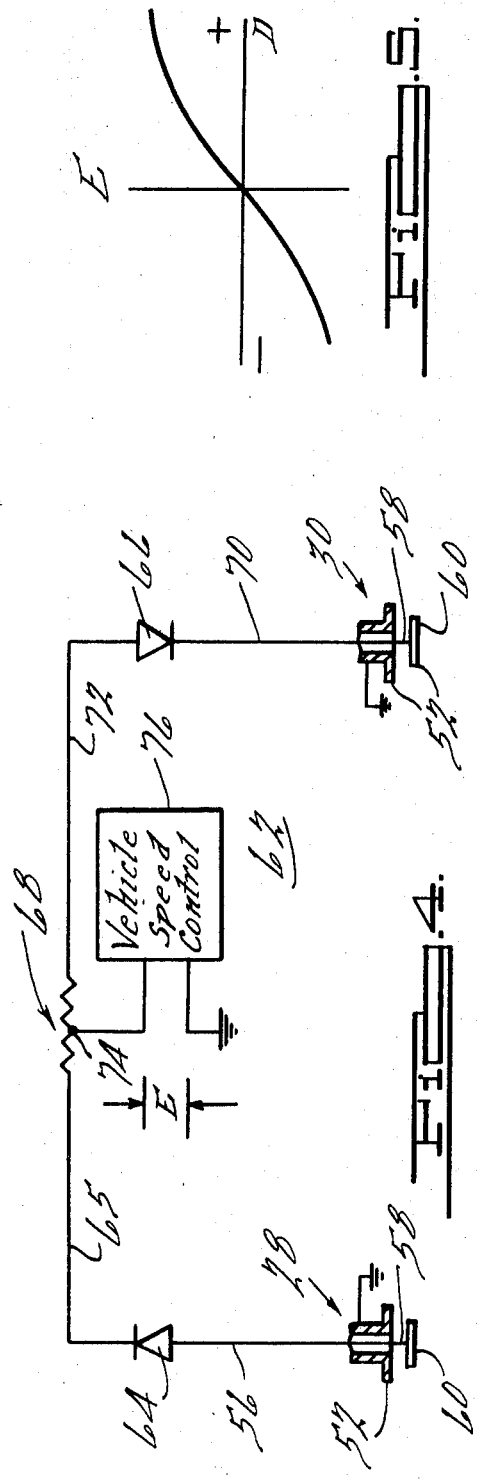
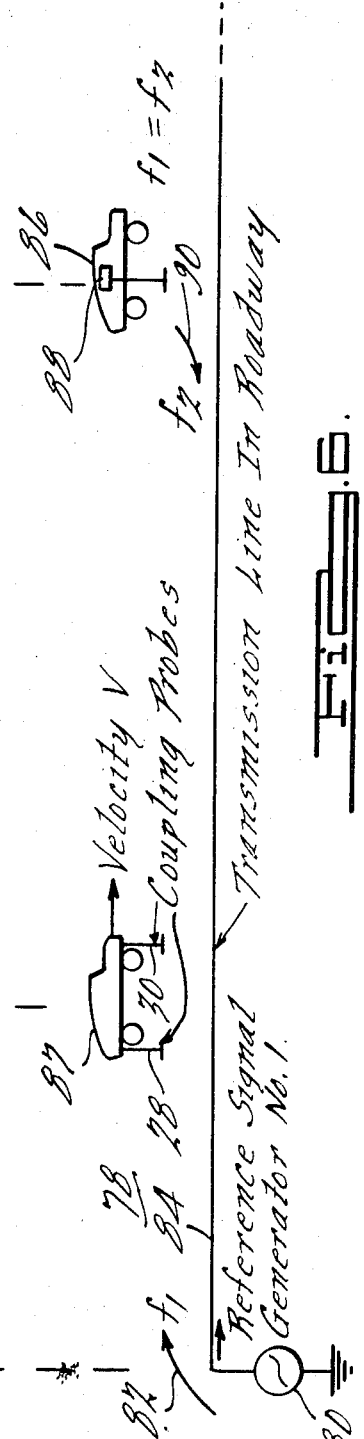
INVENTOR.
Adolphus R. Perry
BY William F. Thornton
ATTORNEY.

CONTROL SYSTEM FOR VEHICLES

BACKGROUND OF THE INVENTION

1. Field of the Invention

Control systems for vehicles.

2. Description of the Prior Art

It is known in the art to use a motor-driven probe to track precessing nulls in standing waves on a transmission line. Although many complex methods have been devised to control vehicles moving along a pathway, a system for tracking nulls on the pathway is not heretofore been adapted for the control of the spacing and velocity of vehicles.

SUMMARY OF THE INVENTION

The present invention provides a system for controlling the velocity and spacing of a plurality of vehicles on a pathway having a signal source at each end of the pathway emitting time-variant signals in opposing directions to provide a composite signal having characteristic value separated by predetermined intervals along the path, one of the signals being controlled to cause movement of the characteristic value at a predetermined velocity along the path. Each vehicle is equipped with a device for detecting the characteristic value such that it may be velocity controlled to track the characteristic value along the pathway.

In one embodiment, each signal source emits a radio frequency since wave which interferes to provide a plurality of nulls spaced along the pathway according to the nominal frequency of the signals. The frequency of one of the signals is offset using a continuously adjusted phase shifter to cause the nulls to precess along the pathway at a predetermined velocity. Each of the vehicles is equipped with a pair of coupling probes to detect its location with respect to the null. A signal representative of the relative location of the vehicle is delivered to an automatic speed control to cause the vehicle to maintain proximate alignment with the precessing null.

In a second embodiment, a stationary signal source emits a sine signal along the pathway in a first direction. A vehicle moving along the pathway receives the signal from the stationary source, and by means of a repeater amplifier, emits a signal back towards the source at the same frequency. The repeated signal establishes nulls on the pathway which precess at the velocity of the vehicle carrying the repeater amplifier. Therefore, other vehicles on the pathway may be caused to track the nulls thereby provided so that the spacing and the velocity of the other vehicles are controlled.

In a third embodiment, the signal sources at each end of the pathway emit a train of opposing pulses, the pulses from the respective sources being at different carrier frequencies. A detecting system is carried by each vehicle on the pathway which determines if the respective vehicle is leading or lagging the coincidence location of the pulses from each source to provide a suitable error signal. In the manner previously described with respect to the nulls, the location of the coincidence of the pulses precesses along the pathway according to the difference in the rate of generation of the pulses.

It is preferred to locate a RF transmission line along the pathway, for example, in the road that supports the vehicles. However, free space transmission of the signals may be used.

BRIEF DESCRIPTION OF THE DRAWINGS

FIG. 1 is a schematic illustration of a first embodiment of a vehicle control system according to this invention.

FIG. 2 is a cross-sectional view of a transmission line embedded in a roadway suitable for use with the control system of this invention.

FIG. 3 is a perspective illustration of a capacitive disc coupling probe for the vehicle controlled by the system of this invention.

FIG. 4 is a schematic illustration of a vehicle mounted system for automatically controlling the speed of the vehicle so as to track a precessing null.

FIG. 5 is a graph illustrating the control signal provided by the system of FIG. 4.

FIG. 6 is a schematic illustration of a second embodiment of a vehicle control system according to this invention.

DETAILED DESCRIPTION OF THE PREFERRED EMBODIMENT

Figure 7:
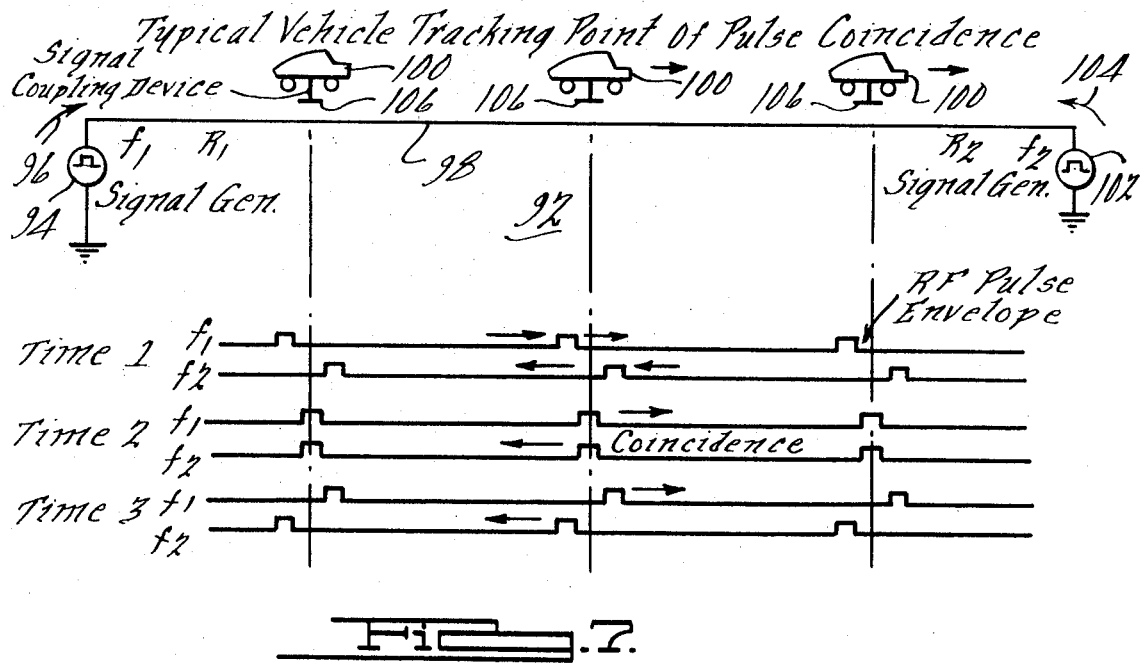
FIG. 7 is a schematic illustration of a third embodiment of a vehicle control system according to this invention.

In FIG. 1, a system 10 for controlling the progress of a plurality of vehicles 12 along a roadway or path 14 is shown. The system 10 has a first source 16 for continuously emitting radio frequency signals having sine-amplitude variations at frequencies $f_1$ along the path 14 in the direction of arrow 18. The signals are generally contained in a transmission line to be described hereinafter. The system 10 further includes a second source 20 for continuously emitting radio frequency signals having sine-amplitude variations at frequency $f_2$ along the pathway 14 in a direction indicated by arrow 22, opposite the direction of the signals from the first source 16. The second signal source 20 includes a radio frequency sine wave generator 24 providing signals at the same frequency as the first source 16, and continuously variable phase shifter 26.

As will be appreciated by those skilled in this art, the radio frequency signals from so$rces 16 and 20 combine, i.e., superimpose to provide a composite signal commonly referred to as a "standing" wave. The "standing" waves formed from sine wave signals are characterized by a plurality of nulls or locations of minimum amplitude separated at predetermined intervals along the wave, and hence, along the pathway 14. The nulls are separated a distance equal to one-half the wavelength of the signals generated by the sources 16 and 20. The nulls of the "standing" wave serve as a characteristic value which are spaced at predetermined intervals along the pathway 14.

The second source of radio frequency signals 20 may be frequency controlled by continually and uniformly adjusting the phase shifter 26. Since the source 16 and the generator 24 are of the same frequency, an offset in frequency of the so$rce 20 with respect to the source 16 is provided thereby establishing an effective frequency $f_2$ from source 20 which is less than $f_1$ which results in a precession of the "standing" waves along the pathway 14 in the direction indicated by the arrow 18. The frequency offset may be provided by rotating the phase shifter 26 such that it continuously delays the signal from the generator 24. The difference between frequency $f_1$ from the source 16 and frequency $f_2$ from the source 20 establishes the rate of precession, i.e., the progress of the nulls along the pathway 14 more particularly, the velocity of the vehicles may be determined by the relationship:

$$v = (f_2 - f_1)C / \sqrt{\epsilon_r} f_1$$

where:

$C$ = speed of electromagnetic radiation in vacuum $\epsilon_r$ = relative dielectric constant of medium The vehicles 12 are each provided with a rear coupling probe 28 and a forward coupling probe 30 for detecting the nulls of the precessing "standing" wave along the pathway 14 such that the position of the vehicles 12 with respect to the most proximate null may be ascertained and an appropriate error signal may be generated.

In view of the above discussion, it will be appreciated that the spacing of the vehicles can be determined by the mean frequency generated by the sources 16 and 20, and the velocity or rate progress of the vehicles 12 can be controlled by adjustment of the rate of be controlled by adjustment of the rate of phase shift provided by the phase shifter 26 which provides the offset between frequency $f_1$ and $_2$.

In the control system 10, a central control 32 is provided for controlling both the spacing and the rate of progress of the vehicles 12. The central control 32 provides a control signal on lines 34 and 36 which, for example, may be in the form of a subharmonic of the desired frequency $f_1$. The source 16 and the generator 24 are preferably harmonic generators which receive the subharmonic control signal on lines 34 and 36, respectively, and generates the multiple frequency $f_1$ therefrom. Harmonic generators are well known in the art, and therefore, a detailed description of a generator of that type will not be provided here.

The central control 32 also provides a sine wave signal on line 38 which represents the constant rate of turning of a servomotor 40 which is mechanically linked to the phase shifter 26 by a shaft 42. Therefore, one rotation of the servomotor 40 in response to one sine wave cycle shifts the phase of the frequency $f_1$ 360°, such that 1 rotation per second of the motor 40 will provide a downward frequency shift of 1 cycle per second.

In an explaining illustration of the operation of the system 10, the following operating conditions will be considered. Presuming that the desired velocity of the vehicles 12 is 50 miles per hour, and the desired spacing is 103.3 feet, a frequency $f_1$ of 4.75 mHz. is required and a continuous phase shift of 0.71 cycle per second is required. Accordingly, the signal on lines 34 and 36 will be a subharmonic of 4.75 mHz; for an example, 1/1,000 of 4.75 mHz. to facilitate transmission of the control signal over conventional communication lines such as telephone networks. The sine signal on line 38 will be established as 0.71 cycle per second so as to control the rotation of the servomotor 40 at that rate.

In FIG. 2, a cross section of a transmission line 44 is shown embedded in the roadway 14. The transmission line 44 is adapted to leak or emit a portion of the radio frequency energy transmitted therealong. The transmission line 44 includes a metallic U-channel shaped ground conductor 46 and a metallic center conductor 48 internally positioned in equidistant relationship with the sides of the U-section at the upper portion thereof. The center conductor 48 is maintained in this spaced relationship and is insulated from the ground conductor 46 by a dielectric material 50 which may be foamed Teflon (tetrafluoroethylene) or ceramic material. As can be seen in FIG. 2, the transmission line 44 is constructed to withstand the abuse to which it may be exposed by virtue of its roadway location. In some installations, it may be desirable to position the transmission line 44 above or to the side of the roadway rather than embedded in the roadway as shown in FIG. 2.

In FIG. 3, a probe 28 (or 30) for the vehicles 12 is shown in detail. The coupling probe 28 includes a ground plane 52 which may be the body of the vehicle 12 on which it is mounted which is electrically connected to the outer conductor 54 of a coaxial cable 56. An inner conductor 58 of the coaxial cable 56 has electrically connected thereto, a capacitive disc 60 which extends downwardly from the underbody or ground plane 52 of the vehicle 12. The capacitive disc 60 is adapted to be positioned adjacent the transmission line center conductor 48 for capacitive coupling therewith when the vehicle is on the roadway 14.

Means (not shown) are provided for maintaining the alignment of the vehicles 12 over the transmission line 44 so that the capacitive relationship between the disc 60 and the center conductor 48 is maintained relatively constant. For example, this means may be rails or tracks for the vehicles 12 or a pantograph or other extension such as that found on electric railroads and trolleys which maintain the position of the capacitive disc 60 with respect to the center conductor 48.

In FIG. 4, a vehicle-mounted control system 62 is shown for adjusting the velocity of a vehicle 12 such that it maintains its position with respect to the precessing nulls of the "standing" wave on pathway 14. The control system 62 is operatively connected to coupling probes 28 and 30 to receive the signals therefrom. Particularly, the signal on coaxial conductor 56 from probe 28 is coupled through a diode 64 which detects the amplitude of the radio frequency signal. A positive polarity signal representative of the amplitude of the detected signal is delivered by line 66 to a center tapped resistor 68.

The signal on line 70 from the coupling probe 30 is detected by a diode 66, connected in reverse polarity with respect to diode 64 to provide an amplitude modulated signal of negative polarity on line 72. Line 72 is connected to an opposite end terminal of the center tapped resistor 68 such that a signal representative of the difference in the detected amplitudes on lines 66 and 72 is provided at the center tap 74. This signal appears as a voltage E with respect to ground.

With reference now to FIG. 5, the manner in which the voltage E varies with respect to the displacement of the vehicle 12 in relation to distance-equal-spacing of the coupling probes 28 and 30 with respect to the null in the "standing" wave on pathway 14. Particularly, displacement of the vehicle in the forward direction provides a correspondingly increasing voltage E of positive polarity and displacement of the vehicle 12 in the rearward direction causes a correspondingly increasing voltage E of negative polarity. Accordingly, the two-probe detecting system 62 provides a signal which not only varies in amplitude with the distances from the null to the center point between the probes, but also in polarity to unambiguously indicate whether the vehicle is leading or lagging the nulls.

The voltage E may be advantageously used by a vehicle speed control 76 which is commercially available on current model automobiles to control the speed of the vehicle according to speedometer readings. Conveniently, the voltage E will be zero if the coupling probes 28 and 30 are equidistantly spaced on opposite sides of the null of the "standing" waves.

In FIG. 6, a second control system 78 according to the present invention is shown. The control system 78 has a first source 80 of radio frequency sine wave signals at frequency $f_1$ which are emitted in the direction of arrow 82 along roadway 84. In this embodiment, the second source of radio frequency sine wave signals is provided by a vehicle 86 progressing along the roadway 84 at a predetermined velocity. Particularly, the vehicle 86 carries a repeater amplifier 88 which receives the signal $f_1$ from source 80 and generates an amplified signal of substantially the same frequency such that it is propagated in the opposite direction as indicated by arrow 90. The frequency from the repeater amplifier 88 is phase-shifted by virtue of the movement of the vehicle 86 to yield an effective frequency $f_2$ which is offset from the frequency $f_1$ in accordance with the velocity of the vehicle 86. This offset may be described in terms of the doppler effect.

The signal at frequency $f_2$ from the repeater amplifier 88 and the signal at frequency $f_1$ from the source 80 combine to produce "standing" waves along the roadway 84 essentially as described in the embodiment of FIG. 1. The "standing" waves precess along the roadway 84 at the velocity of the vehicle 86 by virtue of the movement of the vehicle 86. Accordingly, a second vehicle 87 equipped with a pair of coupling probes 28 and 30 described in connection with FIG. 1 is suitable for tracking nulls on the roadway 84 so as to maintain an interval with respect to the vehicle 86 substantially equal to one-half of the wavelength of signal $f_1$, and to progress at the same rate as the vehicle 86.

In the embodiment of FIG 6, it is possible to have a plurality of vehicles with repeater amplifiers 88 on the same roadway, however, initial misspacing of the vehicles or later variance of the vehicles from the null position will cause superimposition of a plurality of "standing" waves, and consequent ambiguity with respect to the position of the null. Therefore, in the embodiment of FIG. 6, it is desirable to have only the lead vehicle carry an operating repeater amplifier 88.

In FIG. 7, still another embodiment of this invention is shown. Particularly, a control system 92 is provided having a first source 94 generating a train of pulses, each comprising a short burst of energy at frequency $f_1$, at a predetermined temporal spacing or repetition rate. The pulses from source 94 are propagated in a direction of arrow 96 along the pathway 98 for the vehicles 100. A second source 102 is provided which emits a train of pulses at frequency $f_2$ at a predetermined repetition rate which is offset from the repetition rate of the pulses at 96, which propogate in an opposite direction indicated by the arrow 104. The pulse generators 94 and 102 may be square-wave modulated microwave generators. A phase shifter may be used with the pulse generator 102 as described in FIG. 1.

In this embodiment, the rate of repetition of the pulses functionally corresponds to the frequency generated by the two signal sources of the embodiment of FIG. 1. Particularly, the nominal rate of generation of the pulses establishes the separation of the vehicles on the roadway 98, and offset between the respective rates of generation of the pulses from the sources establishes the velocity or precession of the characteristic value tracked by the vehicles 100.

In this embodiment, the characteristic value tracked by the vehicles 100 is the location of coincidence of pulses from source 94 and source 102. This can be more clearly seen in the time sequence chart of FIG. 7. If a vehicle 100 detects coincidence, it is known that the vehicle is at its proper location on the roadway 98. If one of the pulses is detected before the other, it is known that the vehicle is either leading or lagging its assigned station depending upon which pulse is detected first.

Figure 8:
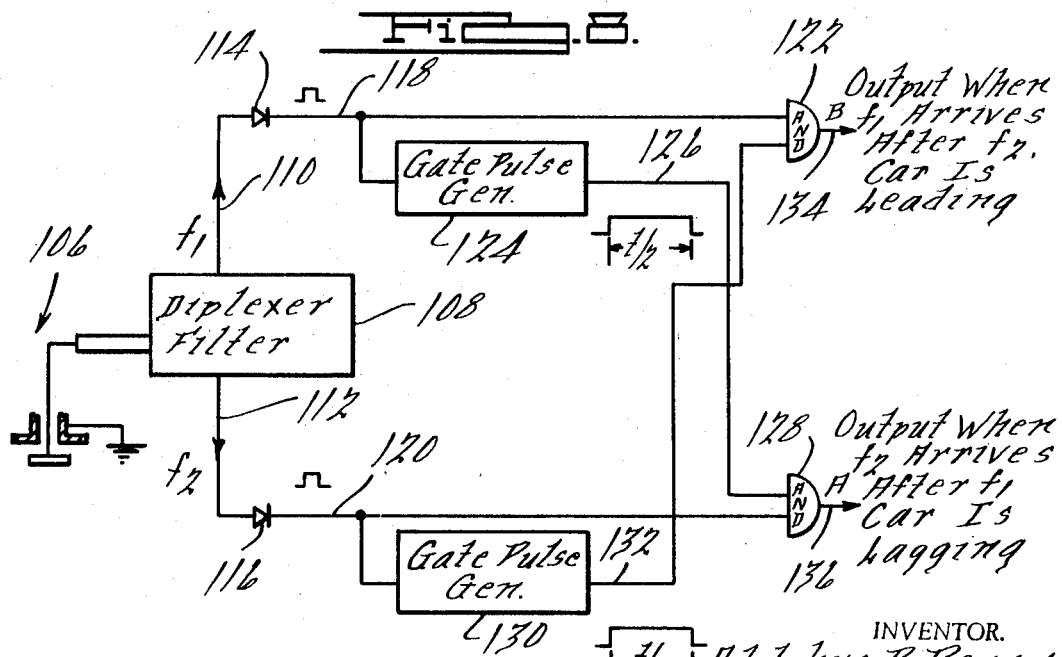
FIG. 8 is a schematic illustration of a vehicle-mounted system to detect pulse coincidences suitable for use with the control system of FIG. 7.

In FIG. 8, a circuit for a vehicle 100 is shown for detecting the coincidence of pulses. Particularly, each vehicle 100 is provided with a probe 106 for electromagnetic coupling with the transmission line in the roadway 98 to receive the pulses from signal sources 94 and 102. The pulses received by the coupling probe 106 are frequency discriminated by a duplex filter 108 to provide pulses on line 110 representative of pulses received at frequency $f_1$ and pulses on line 112 representative of pulses received at frequency $f_2$. The pulses on lines 110 and 112 are detected by detectors 114 and 116 provide signals on lines 118 and 120, respectively, representative of the amplitude thereof. The signal on line 118 representative of pulses at frequency $f_1$ are delivered to one input of an AND-circuit 122 and to a gate pulse generator 124 which provides an enabling signal having a preferred length equal to one-half of the temporal separation of the pulses. The enabling signal on line 126 from the gate pulse generator 124 is delivered to one terminal of an AND-circuit 128. The signal on line 120 representative of pulses at frequency $f_2$ are delivered to the other terminal of AND-circuit 128 and to a gate pulse generator 130 which provides an enabling pulse on line 132 having a preferred length equal to one-half of the temporal separation of the pulses. The enabling signal on line 132 is delivered to the other terminal of the AND-gate 122.

In operation, the AND-gate 122 provides an output on line 134 if a pulse at frequency $f_1$ arrives after a pulse at frequency $f_2$, and AND-gate 128 provides a pulse on line 136 if a pulse at frequency $f_1$ arrives before a pulse at frequency $f_2$. More particularly, a pulse at frequency $f_2$ enables the AND-gate 122 to provide an output therefrom in the event of a following pulse at frequency $f_1$. Conversely, a pulse at frequency $f_1$ provides an enabling signal at the AND-gate 128 such that the later arrival of a pulse at frequency $f_2$ will provide an output from the AND-gate 128. Therefore, an output on line 134 from AND-gate 122 and no output from AND-gate 128 is an indication that the car is ahead of the location of the coincidence of the pulses. Conversely, an output on line 136 from AND-gate 128 and no output from AND-gate 122 is an indication that the car is behind the location of the coincidence of pulses. If the car is at the location of coincidence of the pulses, an output is provided by both AND-gates 122 and 128.

Accordingly, it can be seen that the signals on lines 134 and 136 may be suitably used by a vehicle mounted speed control system to control the velocity of the vehicle 100 so that to maintain the location of the vehicle at the coincidence of the pulses on the roadway 98.

Although three embodiments have been described with respect to the control of automotive type vehicles on a roadway, it will be apparent to those skilled in the art that the control system of this invention has many other applications. For example, it may be used to control cargo carrying containers in a warehouse environment or automatic package delivery systems; and it may be adapted for wheeled or wheelless vehicles. The system of this invention also has particular applicability to rapid transit systems where it is desired to control the spacing velocity of trains or like along a railway.

It will be appreciated further that vehicles may be controlled in free space without the use of a transmission line, for example, by using highly directive microwave beams carrying the two superimposing signals.

One of the unique advantages of the system of this invention is the provision of a transmission line in a roadway which provides an improved path for intervehicle radar. The transmission line path is an alternate line to free space transmission of radar signals. By this means, intervehicle radar signals can be transmitted in a curved path along the roadway transmission line whereas, in the free space of transmission signals, curved path transmission is not feasible.

While I have described but three preferred embodiments of the present invention, it should be understood that various changes, adaptions, and modifications may be made therein without departing from the spirit of the invention and the scope of the appending claims.

Having thus described my invention, I claim:

1. A control system for a vehicle comprising:
   a first signal source emitting a first time variant signal in a predetermined direction along a path for said vehicle;
   a second signal source emitting a second time variant signal along said path in a direction opposite said first predetermined direction such that said signals combine to produce a composite signal having a characteristic value, at least one of said signals being controlled to cause movement of said characteristic value at a predetermined velocity along said path; and
   means for said vehicle for detecting said characteristic value such that the progress along said path may be controlled thereby.

2. The control system of claim 1 wherein the amplitude of each of said signals varies as a function of time, and said characteristic value is a location of minimum amplitude of said composite signal.

3. The control system of claim 1 wherein the time variance of at least one of said signals is controlled to cause movement of said characteristic value at a predetermined velocity on said path.

4. The control system of claim 1 wherein one of said signal sources is moved at said predetermined velocity so as to cause movement of said characteristic value at said predetermined velocity.

5. The control system of claim 1 wherein said first and second signal sources emit a train of pulses and wherein said characteristic value are the coincidence of pulses from each signal source.

6. The control system of claim 1 further including a transmission line along said path for carrying said first and second signals.

7. The control system of claim 2 wherein the time variance of the amplitude of at least one of said signals is controlled to cause movement of said characteristic value at a predetermined velocity on said path.

8. The control system of claim 2 wherein one of said signal sources is moved at said predetermined velocity so as to cause movement of said characteristic value at said predetermined velocity.

9. A system for controlling the progress and spacing of a plurality of vehicles along a path for said vehicles comprising:
   a first signal source emitting a time variant signal in a first predetermined direction along said path;
   a second signal source emitting a second time variant signal along said path in a direction opposite said first predetermined direction such that said signals combine to produce a composite signal having a plurality of characteristic values separated by intervals along said path determined by the rate of variance of said signals, at least one of said signals being controlled to cause movement of said plurality of characteristic values at a predetermined velocity along said path; and
   means for each of said vehicles for detecting one of said characteristic values such that the progress of said vehicle may be controlled thereby in a manner which establishes the position of said vehicle with respect to the position of the other of said vehicles.

10. The system for controlling the progress and spacing of a plurality of vehicles according to claim 9 further including a transmission line along said path for carrying said first and second signals.

11. The system for controlling the progress and spacing of a plurality of vehicles of claim 9 wherein said first and second signal sources emit a train of pulses and wherein said characteristic value are the coincidence of pulses from each signal source.

12. The system for controlling the progress and spacing of a plurality of vehicles of claim 9 further including means for each vehicle which is responsive to the detection of a selected one of said characteristic value for controlling the velocity of each of said vehicles to cause each of said vehicles to track said selected one of said indicia.

13. The system for controlling the progress and spacing of a plurality of vehicles of claim 9 wherein the amplitude of each of said signals varies as a function of time, and said characteristic value is a location of minimum amplitude of said composite signal.

14. The system for controlling the progress and spacing of a plurality of vehicles of claim 9 wherein the time variance of at least one of said signals is controlled to cause movement of said characteristic value a predetermined velocity on said path.

15. The system for controlling the progress and spacing of a plurality of vehicles of claim 9 wherein one of said signal sources is moved at said predetermined velocity so as to cause movement of said characteristic value at said predetermined velocity.

16. The system for controlling the progress and spacing of a plurality of vehicles of claim 13 wherein the time variance of the amplitude of at least one of said signals is controlled to cause movement of said characteristic value at a predetermined velocity on said path.

17. The system for controlling the progress and spacing of a plurality of vehicles of claim 13 wherein one of said signal sources is moved at said predetermined velocity so as to cause movement of said characteristic value at said predetermined velocity.

\* \* \* \* \*